Patented Jan. 2, 1951

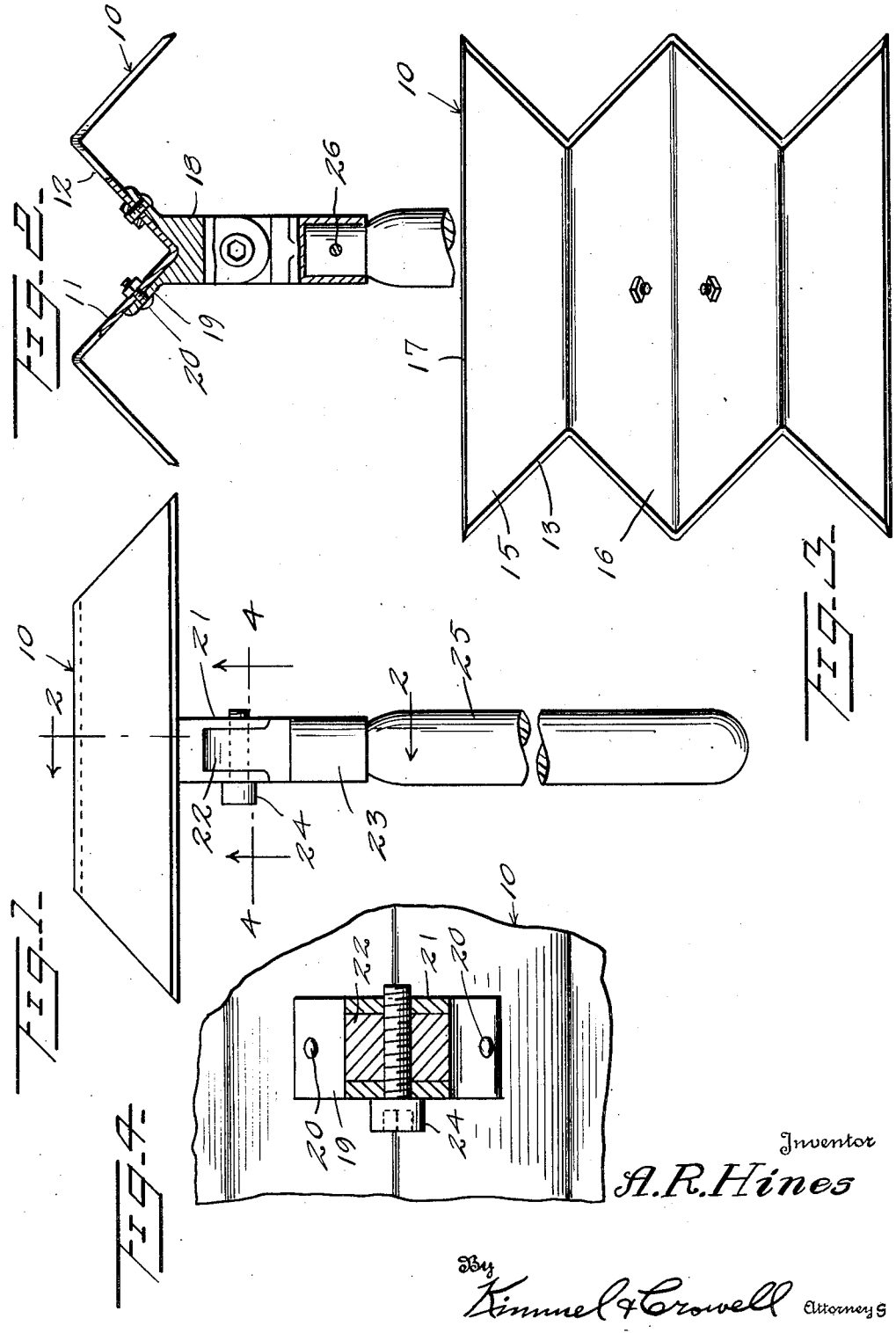

2,536,180

UNITED STATES PATENT OFFICE 2,536,180

ADJUSTABLE HAND CULTIVATING TOOL

Albert Roy Hines, Columbus, Ga.

Application October 24, 1946, Serial No. 705,437

1 Claim. (Cl. 97—70)

This invention relates to a combined rake and hoe.

An object of this invention is to provide a tool formed of a head which is designed for use as a hoe, rake and root cutter, the head having a plurality of V-shaped teeth on opposed edges thereof, and also having a pair of straight digging and cutting edges on the remaining edges thereof, so that the head will provide four working edges.

Another object of this invention is to provide a tool of this kind wherein the head or blade may be stamped from a sheet of metal.

With the above and other objects in view, my invention consists in the arrangement, combination and details of construction disclosed in the drawings and specification, and then more particularly pointed out in the appended claim.

In the drawings,

Figure 1 is a detail side elevation of a garden tool constructed according to an embodiment of this invention, Figure 2 is a sectional view taken substantially on the line 2—2 of Figure 1, Figure 3 is a bottom plan of the device, Figure 4 is a sectional view taken on the line 4—4 of Figure 1.

Referring to the drawing, the numeral 10 designates generally the head or blade of the garden tool which is constructed according to an embodiment of this invention. The head or blade 10 is constructed from a single piece of sheet metal which is stamped or otherwise formed so as to provide a pair of connected V-shaped blades 11 and 12. The blades 11 and 12 are of like construction and the opposite ends of the blades are formed with V-shaped cut-outs 13 which form pointed or triangular blades 15 and 16.

The plate or head 10 also includes a pair of opposed straight edges 17 which are sharpened to provide keen edges, and constitute hoe or cutting edges in addition to the V-shaped cutting edges 13. The head or blade 10 is secured to a mounting comprising a body 18 which is formed with a pair of divergent arms 19 secured by fastening members 20 to the two blade members 11 and 12.

The body 18 is also formed with a pair of ears 21 between which an ear 22 carried by a socket member 23 is adapted to be engaged. A bolt or pivot member 24 extends through the ears 21 and 22 and may be threaded into one of the ears 21 so that the socket 23 may be held in alignment with the body 18 or disposed on any selected angle with respect thereto. A handle 25 is adapted to be secured in the socket 23 by means of a securing pin 26, or the like.

In the use and operation of this tool, where it is desired to either rake or break up the ground surface, the teeth 15 and 16 at one edge of the tool may be engaged with the ground. These teeth also constitute root cutting means for cutting the roots of weeds, plants, or the like, in addition to breaking up the ground surface. Where plants are to be cut or the tool used as a hoe, the head 10 is turned so one straight edge 17 will engage the ground. The tool hereinbefore described will provide a combination tool of simple construction wherein various ground working operations may be performed with a single tool.

I do not mean to confine myself to the exact details of construction herein disclosed, but claim all variations falling within the purview of the appended claim.

What I claim is:

An improved combination garden tool comprising a head including a rectangular plate having a pair of parallel longitudinally extending V-shaped channels formed therein, V-shaped teeth formed on the opposite end edges of said plate, a mounting bracket having a V-shaped end thereon adapted to engage the adjacent converging sides of said pair of channels and secured thereto, a pair of spaced lugs formed on the opposite end of said bracket and at right angles to the longitudinal axis of said channels, and a handle pivotally mounted between said lugs for rocking relative to said head about an axis parallel to the longitudinal axis of said channels.

ALBERT ROY HINES.

REFERENCES CITED

The following references are of record in the file of this patent:

UNITED STATES PATENTS

| Number | Name | Date |
|---|---|---|
| 320,112 | Arnold | June 16, 1885 |
| 898,306 | Bodenstein | Sept. 8, 1908 |
| 985,074 | Sohn | Feb. 21, 1911 |
| 1,004,253 | Hannegan | Sept. 26, 1911 |

FOREIGN PATENTS

| Number | Country | Date |
|---|---|---|
| 676,399 | France | Nov. 28, 1929 |